(12) United States Patent
Shah et al.

(10) Patent No.: US 11,182,402 B2
(45) Date of Patent: Nov. 23, 2021

(54) SYSTEMS AND METHODS FOR STANDARDIZING INTERFACES FOR THIRD PARTY INTEGRATION

(71) Applicant: Google LLC, Mountain View, CA (US)

(72) Inventors: Anand Shah, New York, NY (US); Gopal Lal, Indore MP (IN); Michael Harm, Boulder, CO (US); Hiranmoy Saha, Bangalore KA (IN); Nikanth Karthikesan, Bangalore KA (IN); Michael Winser, Westport, CT (US); Saumya Pathak, Bhopal MP (IN)

(73) Assignee: Google LLC, Mountain View, CA (US)

( * ) Notice: Subject to any disclaimer, the term of this patent is extended or adjusted under 35 U.S.C. 154(b) by 798 days.

(21) Appl. No.: 15/372,132

(22) Filed: Dec. 7, 2016

(65) Prior Publication Data

US 2018/0157726 A1 Jun. 7, 2018

(51) Int. Cl.
  *G06F 16/25* (2019.01)
(52) U.S. Cl.
  CPC .......... *G06F 16/258* (2019.01); *G06F 16/252* (2019.01)
(58) Field of Classification Search
  CPC .................................................. G06F 16/258
  See application file for complete search history.

(56) References Cited

U.S. PATENT DOCUMENTS

| 6,795,868 | B1 * | 9/2004 | Dingman | G06F 16/258 |
| | | | | 709/246 |
| 2004/0220982 | A1 * | 11/2004 | Probert, Jr. | G06F 16/258 |
| 2005/0278307 | A1 * | 12/2005 | Battagin | G06F 16/25 |
| 2007/0208765 | A1 * | 9/2007 | Li | G06F 16/258 |
| 2009/0119575 | A1 * | 5/2009 | Velusamy | G06F 17/243 |
| | | | | 715/226 |
| 2009/0138808 | A1 * | 5/2009 | Moromisato | G06Q 10/10 |
| | | | | 715/758 |
| 2011/0238620 | A1 * | 9/2011 | Ramineni | G06F 16/273 |
| | | | | 707/610 |
| 2011/0321147 | A1 * | 12/2011 | Chakra | G06F 21/6218 |
| | | | | 726/9 |
| 2012/0291011 | A1 * | 11/2012 | Quine | G06F 9/45512 |
| | | | | 717/115 |
| 2013/0304724 | A1 * | 11/2013 | Rosjat | G06F 16/9535 |
| | | | | 707/722 |
| 2014/0019511 | A1 * | 1/2014 | Fradkov | G06Q 20/04 |
| | | | | 709/201 |
| 2016/0357971 | A1 * | 12/2016 | Sinha | G06F 21/602 |
| 2017/0300540 | A1 * | 10/2017 | Karpistsenko | H04L 29/06027 |

* cited by examiner

*Primary Examiner* — Dawaune A Conyers
(74) *Attorney, Agent, or Firm* — Lerner, David, Littenberg, Krumholz & Mentlik, LLP

(57) ABSTRACT

A computer-implemented method for performing data integration, the method comprising establishing a connection between a first application and a first remote database, wherein the connection is established using a connection file containing metadata required to establish the connection, requesting, by the first application, data from the first remote database that stores the data in a first format, wherein the metadata is used to determine whether the first application is authorized to access the data in the first remote database, importing the data in the first format from the first remote database, converting, by the first application, the data in the first format to data in a native format that is specific to the first application, and providing the data in the native format to a user of the first application.

20 Claims, 9 Drawing Sheets

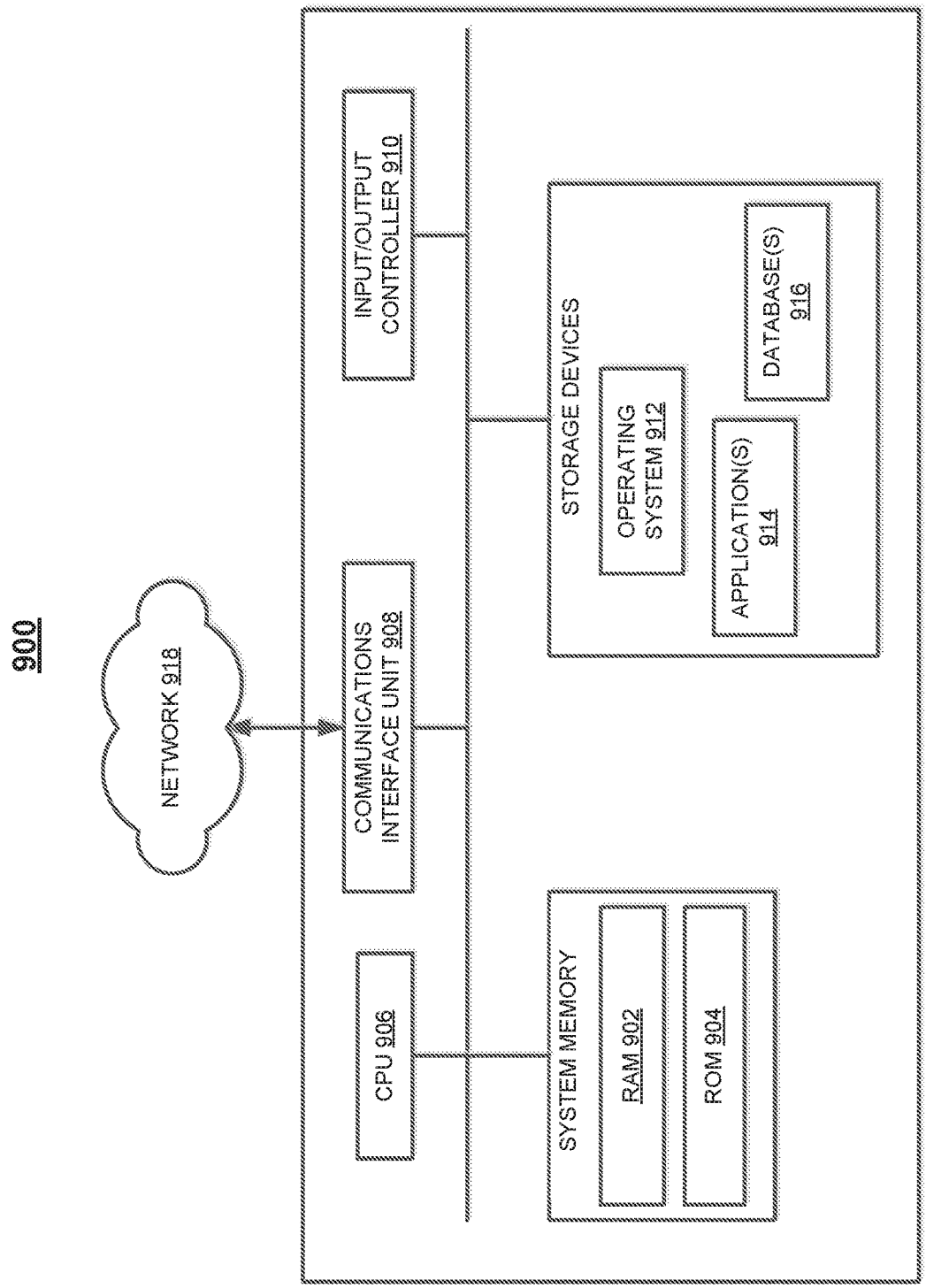

SYSTEMS AND METHODS FOR STANDARDIZING INTERFACES FOR THIRD PARTY INTEGRATION

BACKGROUND

Data is often stored in multiple databases, each of which is remote from a user's device. In these cases, users who want to access remote data must first import the data from the remote databases to their local devices. Often, the remote databases store data in a specific format. This specific format is sometimes proprietary to a third party that is different from the user, and often is different from a desired format that the user wishes to use at the local device (e.g., the specific format may not match a format that is compatible with the local device). Existing import methods allow users to import data from a remote database, but only in the same specific format in which the remote data is stored. In this case, the user often spends a large amount of time modifying the imported data to obtain the desired format, which causes substantial and unnecessary delays.

SUMMARY

Systems and methods are disclosed herein for performing data integration. According to one aspect, a connection between a first application and a first remote database is established, wherein the connection is established using a connection file containing metadata required to establish the connection. The first application requests data from the first remote database that stores the data in a first format, wherein the metadata is used to determine whether the first application is authorized to access the data in the first remote database. Data in the first format is imported from the first remote database. Data from the first format to a native format that is specific to the first application is converted by the first application. The data is provided in the native format to a user of the first application.

Another aspect relates to a system including means for establishing a second connection between the first application and a second remote database while the first application is still connected to the first remote database. The system further comprises means for the second remote database storing data in a second format, and the method further comprises importing data from the second remote database in the second format and converting, by the first application, the data in the second format to additional data in the native format. The system further comprises means for sharing the connection file is with a plurality of collaborative users of the first application by an administrator of the first remote database, wherein the plurality of collaborative users includes the user. The system further comprises means for hiding the data in the first format from the user.

In some implementations, the system further comprises means for receiving, from the user, a modification of the data in the native format to obtain modified data in the native format, converting the modified data in the native format to modified data in the first format, and transmitting the modified data in the first format to the first remote database. The system further comprises means for receiving, from the first remote database, additional data in the first format when the additional data in the first format is added to the first remote database. The system further comprises means for sharing the connection file with a plurality of collaborative users of the first application by an administrator of the first remote database, wherein the plurality of collaborative users includes the user, and the receiving of the additional data in the first format causes a notification to be transmitted to the plurality of collaborative users. The system further comprises means for establishing the connection between the first application and the first remote database comprises using an application programming interface associated with the first remote database, the method further comprising importing the application programming interface of the first remote database into the first application and providing, using the first application, the user with suggested autocomplete functions to be performed in the first application. The system further comprises means for providing to the user in the first application, a detailed description of each command in the application programming interface.

In some implementations, data integration is performed. According to one aspect, a connection between a first application and a first remote database is established, wherein the connection is established using a connection file containing metadata required to establish the connection. Request by the first application, data from the first remote database that stores the data in a first format, wherein the metadata is used to determine whether the first application is authorized to access the data in the first remote database. Import the data in the first format from the first remote database; converting, by the first application, the data in the first format to data in a native format that is specific to the first application. And provide the data in the native format to a user of the first application.

BRIEF DESCRIPTION OF DRAWINGS

FIG. 9 is a block diagram of a computing device for performing any of the processes described herein, according to an illustrative embodiment.

DETAILED DESCRIPTION

Figure 1:
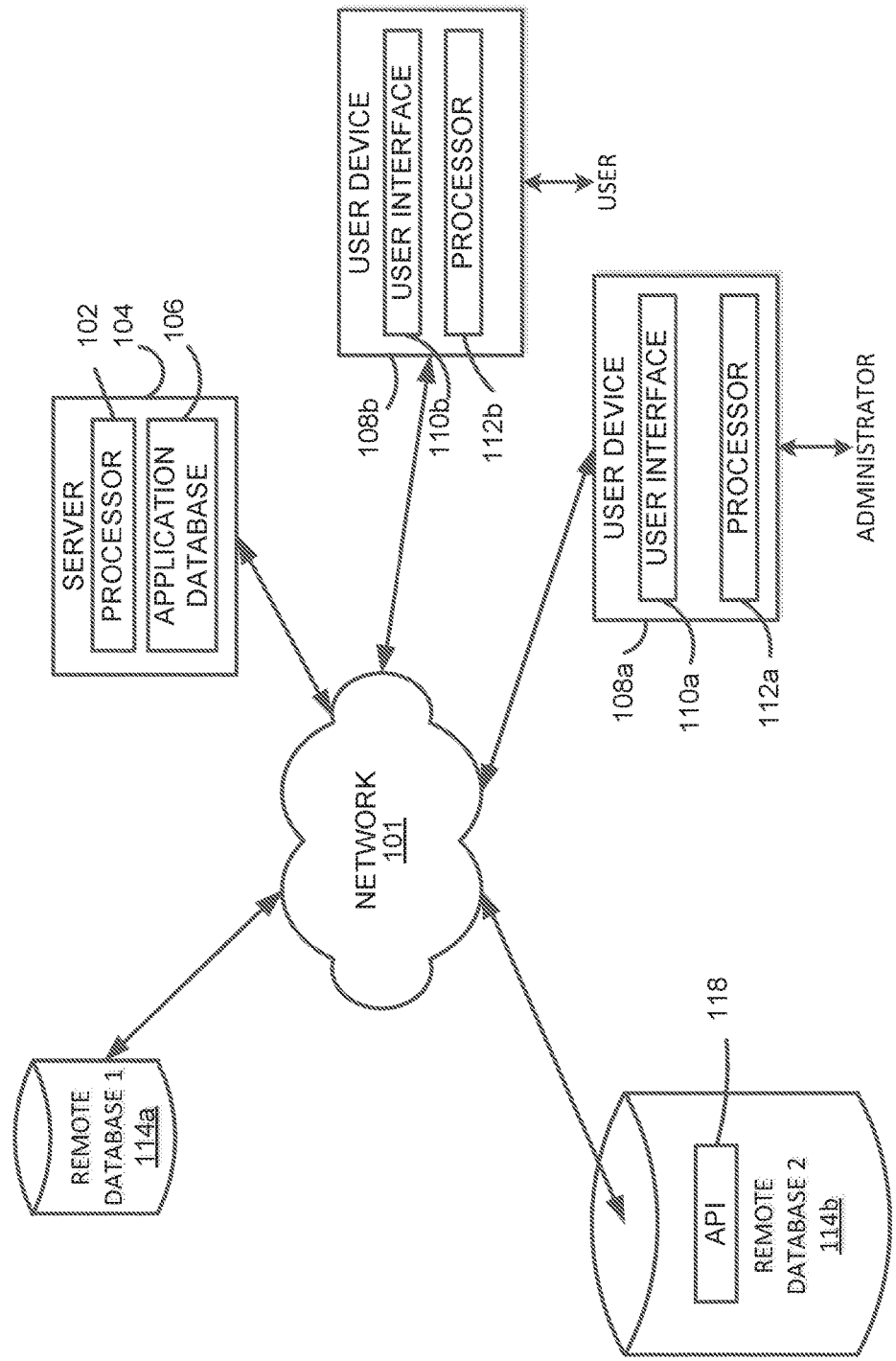
FIG. 1 is a block diagram of a computerized system 100 for importing data from a remote database, according to an illustrative embodiment.

To provide an overall understanding of the disclosure, certain illustrative embodiments will now be described, including systems and methods for connecting with remote databases. In particular, a connection between an application and a remote database is described. The application modifies the format of the data imported from the remote database before displaying the modified data to the user. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. Generally, the computerized systems described herein may comprise one or more engines, which include a processing device or devices, such as a computer, microprocessor, logic device or other device or processor that is configured with hardware, firmware, and software to carry out one or more of the computerized methods described herein.

Importing data from multiple remote databases into an application is often time consuming and involves many steps. Each remote database may use a different method to interface with the application to transmit and receive data. Thus, the user may be required to learn multiple such methods of interfacing with each remote database to import data into the application from the multiple remote databases. This further complicates import methods and places a large burden on the user of the application to learn how to interface with at least one or more remote databases to import data.

Instead of placing the burden on the user of an application to learn how to interface to import data from various remote databases, this disclosure describes programming the application to interface with the application to import data from various databases. This programming may be carried out by developers of the application while creating the application. In some embodiments, the developers of the application may realize after creation of the application that the application needs to interface with remote databases and may program software updates to the application that allow the application to interface with the remote database to import data and not require any effort on the part of the user.

Different databases may store data in different formats. When data from different formats is imported into the application, it may take the user a lot of time to find similar fields of data imported from various databases. For example, the user may import sales data of a product from two different remote databases. Both databases may store similar data, but one database may label the number of products sold as 'No. Sold' while the other database may label the same type of data as 'Sales'. Without the systems and methods of the present disclosure, it would take the user a large amount of time to first recognize the similarity in the fields and then convert the data to have the same format. Having the data from multiple different remote databases in the same format is beneficial so that the user can easily compare this information from the two databases. The present disclosure describes system and methods to modify all the imported data into a standard format before presenting the data in the application.

A Company Example is described below and is referred to throughout this disclosure. In the Company Example, a company employs different kinds of employees, and a variety of company data is stored on one or more remote company databases. For example, the company may manufacture and sell a product, and so possesses various types of data, such as sales data, inventory data, personnel data, customer account data, for example. The company data may be stored on one or more databases that are remotely located from the employees of the company and/or one or more servers that the company uses.

Each employee of the company (who may be referred to herein as a user) may be provided with an account on the company server (which may be referred to herein as a company account or the employee's account), which allows the user to have access to the company's applications. In particular, the employee's account on the company server may provide the user with access to a set of company-approved applications. The company-approved applications may include a text editing application, a spreadsheet application and a presentation application, among others. However, the employee's account on the company server may not provide direct access to the remote database that stores the company data. Instead, the employee may gain limited access to the remote database by obtaining a connection file (described in detail below), which may be used by one of the company-approved applications to import certain data from the remote database, modify the imported data to adhere to a particular format, and display the modified data to the employee. The employee's account at the company server may provide the user with access to some data, but the employee account may not provide the user access to the remote company database mentioned in this example.

Access to the company database includes connecting with the company database and importing data from the company database into one of the company-approved applications. While the users are not provided with direct or immediate access to the interface of the company database, the users may still establish a connection with the company database using a connection file. The connection file may be generated by an administrator in the company, who may be a company employee that has special privileges to directly access the remote database. The administrator may be provided with credentials to log into the company database. The administrator uses the credentials provided to him to create a connection file that includes metadata that may be used to connect to the company database, and shares the connection file with other company employees. The connection file does not provide access to the interface of the company database, but rather allows the other company employees to connect to a portion of the company database to import the company's data into a company-approved application, which may operate on the company network or on the employee's device.

Moreover, the company data that the connection file allows to be imported may include only a subset of the company's data that is stored on the remote database, and may be defined specifically for a particular employee or type or employee. For example, the connection file may be shared by the administrator with a member of the company's sales team. In this case, the connection file only allows for the member to use a spreadsheet application to import the company's sales data, but does not allow the member to access any data related to income and cost data (which may be provided for in a second connection file shared with members of the company's finance team) or personnel data (which may be provided for in a third connection file shared with members of the company's human resources team). "Selection data may not be tethered to the identity of individual users.

The connection with the company database may be established from within the application. The user may be provided the option of connecting with the company database from within the application interface. Upon selecting this option, the user may provide the connection file to the application to establish the connection with the company database. Alternatively or additionally, the connection with the company database may be established using the company account on the company's server. The connection may be established using the company account by just opening the connection file in the company account. Establishing a connection using the company account on the company's server may allow all the company-approved applications provided to the user by the company server to connect to the company database to import data. The connection file provided to the user may contain tokens to access the subset of database as assigned by the administrator of the database. The tokens may be hash values, or any other modification of the credentials provided to the company administrator to log in to the company database.

As described above, a set of connection files may be created. The administrator then shares the connection files with different groups of employees over the company network. In this manner, each specified employee receives a connection file to connect to the remote database in his company account. The connection to the remote database may be established by opening the connection file. In one example, the user may first open an application on the company account (such as a spreadsheet application, for example), and decide to import information from the remote database into the application on the company account.

The company-approved applications have been programmed to connect with various different databases where the company data may be stored. Therefore, the user at the company need not put time and effort in learning the semantics of connecting with a particular kind of database server. Instead, this work is taken care of by the developers of the application, which is configured to import data from the company databases (which may store data in different formats) and convert the imported data into a single standard format. In particular, the user may open the application and select an option to import data from the company database. It is possible that data from multiple company databases is stored in different formats. The application is programmed to communicate with the remote databases and understand how the company data is stored in that remote database. The application converts the various formats of the company data into a native format before displaying the data in the application interface to the user. This significantly decreases the burden on the user to understand the various formats and manually aggregate the formats into a single standard format. The native format may be different for different applications, and the native format may be different from the format of the company database. As described above, two different databases may store sales information under two labels, namely, "No. Sold" and "Sales". The applications provided by the company server may display the same information under the label "Quantity Sold". Thus, when the company data is imported from the databases into the applications, the label of the data is modified to "Quantity Sold". In this manner, the systems and methods of the present disclosure provide an automatic way to integrate various data formats into a single standard format before providing the data to users.

FIG. 1 is a block diagram of a computerized system 100 for standardizing interfaces for third party integration, according to an illustrative embodiment. The system 100 includes a server 104, two remote databases 114a and 114b (generally remote database 114), and two user devices 108a and 108b (generally user device 108) that communicate with one another over a network 101. The user devices 108a and 108b contain user interfaces 110a and 110b (generally user interface 110) respectively.

The user device 108 includes a device such as a personal computer, a laptop computer, a tablet, a smartphone, a personal digital assistant, or any other suitable type of computer of communication device. Users at the user device 108 access and receive information from the server 104 and remote databases 114 over the network 101. The user device 108 may include components, such as an input device and an output device. A user may authenticate with the server 104 by inputting a username and password (or providing other identification information) via a user interface 110, such that the same user device 108 may be used by different users at different times. One of the users at user device 108a may be selected to be an administrator of the remote database 114 as discussed in the Company Example. The administrator may be provided access to the remote database 114. The administrator may share access to the remote databases 114 with other users at 108b of the database to import data to their account on the server 104. The users however, are not provided with direct access to the remote database 114. Instead, a user at user device 108 may only have permission to import data that he is authorized to access from the remote database 114 into the user's account on server 104. The user at the user device 108b may have access to a subset of data stored at a remote database 114, via the server 104.

The server 104 provides updates and maintains synchronization of information between the user device 108 and the remote database 114. As shown in FIG. 1, the server 104 contains an application database 106 that provides every user associated with the server 104 with a set of applications that the user may use to access and modify data imported from remote database 114. The user associated with access to user device 108 may access the application database 106 of the server 104 by entering some authenticating information at the user device 108 to establish a secure connection with the server 104 over network 101. The application database 106 contains a variety of applications developed by various developers that have been programmed to communicate with multiple remote databases 114 and import a subset a data from the remote databases 114. The programming of the applications includes a mechanism to converse with various databases and interpret the different formats of storing data on the various remote databases 114. The developers of the applications on application database 106 may at any time add or remove the ability to interface a kind of remote database 114 from the application. While importing data from remote databases 114, the application, may recognize that the format of data stored in the remote database 114 is different from the format of the data displayed in an interface of the application. The application may convert the format of data at the remote database 114 to a standard format of data as required by the application before displaying the data to the user at user device 108. While the application database 106 is shown in FIG. 1 as being stored on the server 104, the applications in application database 106 may run or be stored on user device 108, server 104, or both. The application database 106 at the server 104 contains applications that may be accessed by user at user device 108. One of ordinary skill in the art will understand that FIG. 1 is shown for illustrative purposes only and that the remote database 114 may have more components than API 118. In some embodiments, the remote database 114 may be a stored in server 104 or user device 108, or the remote database may be remote to the server 104 or user device 108 or both.

The remote database 114 may be hidden from users at user device 108b. The administrator of remote database 114 at user device 108a may be provided with access to remote database 114 to make a connection with the remote database 114. The administrator may then create a connection file using the credentials provided and add metadata relevant to establish the connection with the remote database 114. The administrator at user device 108a may share the connection file containing metadata and credentials required to login to the remote database 114 with the users at user device 108b. The users at user device 108b may be able to access a subset of data from the remote database 114 by connecting to the database and importing data to the user device 108.

As described in the Company Example, the connection between the user at user device 108b and remote database 114 is established in such a way that the interface of the remote database 114 is hidden from the user. The user may import a subset of data from the remote database 114 to an application stored in the application database 106. As discussed in the Company Example, the subset of data imported may be decided by the access provided to the user of the company. A user in the finance department may import only finance related information and information pertaining to the sales team. The permissions of a user with respect to remote database 114 are defined in the connection file provided to each user.

The data in the remote database 114 may be stored in a first format and data in the application at user device 108 may be stored in the second format. Before the data is imported from the remote database 114 to the application, the format of imported data from the remote database 114 is converted to the format of data to be displayed at the application interface. This makes it easy for the user to import data from multiple databases in a consistent format for processing.

In FIG. 1, the remote database 114b stores an application programmable interface (API) 118 that is used by the application to extract data according to specific guidelines, according to some embodiments. For example, the user at user device 108 may connect with the remote database of a social networking website and download a list of API calls into a scripting application stored in application database 106 that would be useful in accessing data in the remote database of the social networking website. The user at user device 108 may then access these API calls in the scripting application at user device 108 to access data in the remote database of the social networking site. In some embodiments, the remote database 114a may not include an importable set of API calls, and data from remote database 114a may be imported upon request of the user from an application at user device 108. In some embodiments, the API may be used to execute commands and listen for events at the social networking site. These are discussed later in the disclosure in FIG. 3 and FIG. 8.

Figure 2:
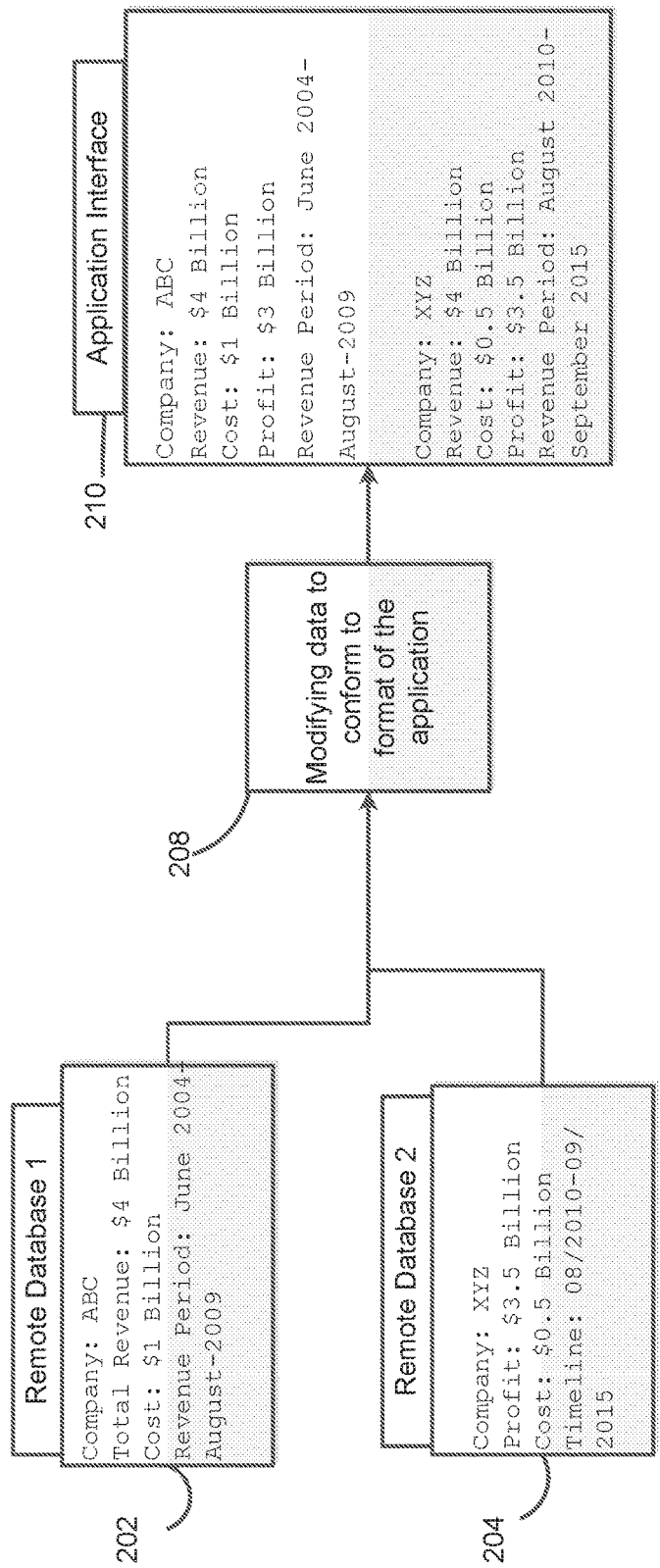
FIG. 2 depicts modifying the format of data from two different databases before displaying them in the application interface, according to an illustrative embodiment.
Figure 3:
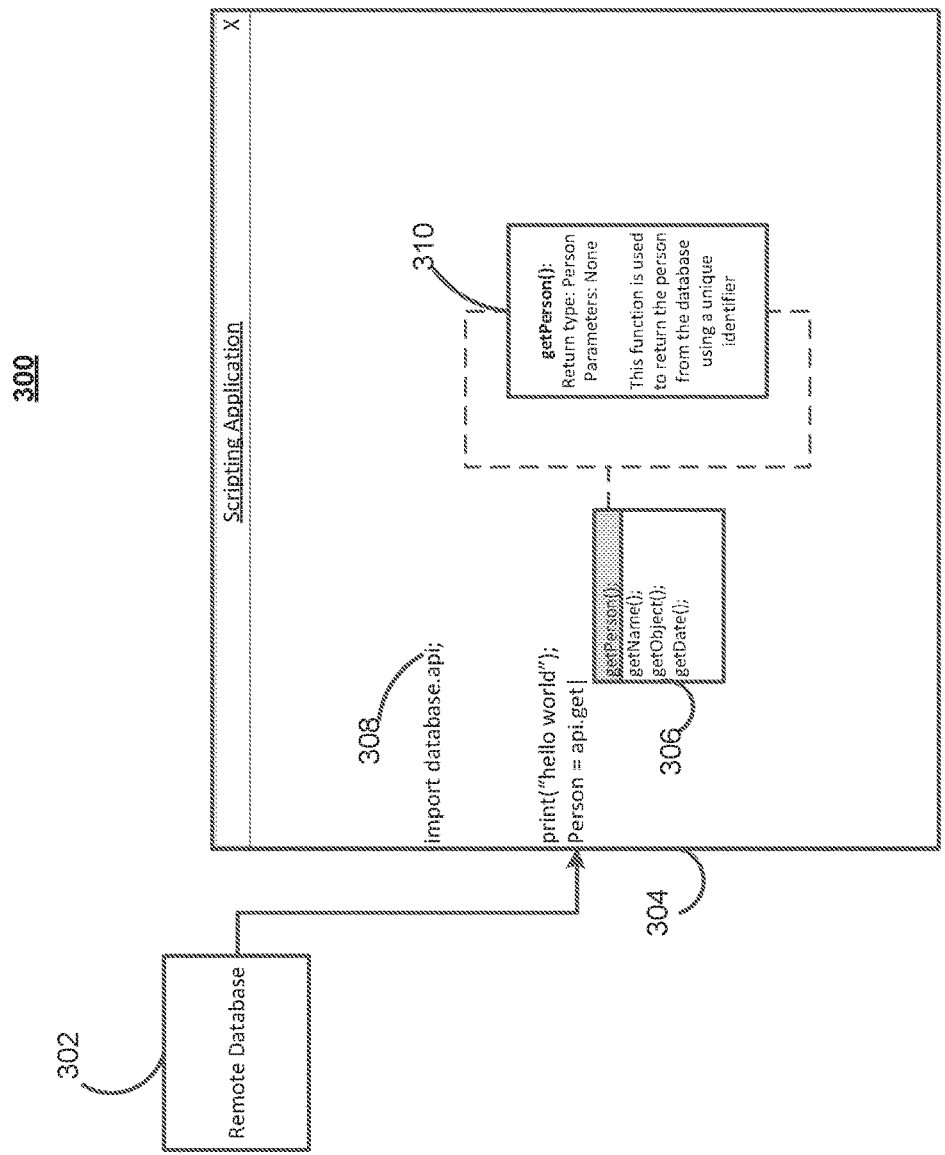
FIG. 3 depicts of providing autocomplete suggestions to a user in a scripting application, according to an illustrative embodiment.

FIGS. 2-3 are diagrams 200 and 300 of exemplary displays of a user interface for users importing data from a remote database, according to various illustrative embodiments. In particular, FIG. 2 depicts of modifying the format of data imported from multiple remote databases before the data is presented to the user. FIG. 3 depicts of importing a set of API calls to access data in a remote database 114 in a scripting application and having the scripting application provide autocomplete suggestions to the user.

FIG. 2 depicts modifying the format of data imported from multiple databases before the data is presented via an application interface to the user, according to an illustrative embodiment. In particular, a connection with remote database 114 is established by a user using the connection file provided by an administrator of the remote database 114, as discussed in the Company Example. In some embodiments, remote database 202 and remote database 204 may be different databases, or may be different portions of the same database. In case the remote databases 1 and 2 are different databases, the user may have two different connection files containing metadata to connect with the two different databases 1 and 2. In some embodiments, the same connection file may contain metadata to connect with two different databases 1 and 2. The connection file provided to the user contains metadata regarding the portions of the database to which the user has been provided access. As described in the Company Example, the connection files are shared with the user from the administrator over a company internal network. The access to the database is regulated by various factors as discussed in the Company Example. The users in the finance department of a company may only be provided with access to the finance data of the company and the users of the sales department may only be provided to the sales portion of the remote database 114. The permission of each user is specified in the connection file provided to the user.

For example, it may be possible that a user in the accounting department of a firm may need access to both the sales and the finance data, but have no access to personnel data. In this case, the user's connection file provided to the user may contain metadata to the finance and sales portions of the remote database but not to the personnel section of remote database. In some embodiments, the interface of the remote databases 1 and 2 is hidden from the user. The connection with the remote database is established using the connection file, and data imported from the remote databases 1 and 2 is brought into an application that renders a display in an application interface at the user device 108. In some embodiments, it may be possible to establish a connection with the remote database 114 from within the application. For example, the interface of the application may allow a user to establish a connection by incorporating metadata from the connection file shared with the user. Connections established using the connection file do not allow the user to access the remote database 114. The process of connecting to the remote database 114 is described in more detail in FIGS. 4-5.

As described in the Company Example, the data being imported from a remote database 114 may be of a format that is different from the format in which data is displayed in the interface of user device 108. FIG. 2 depicts importing records 202 and 204 from two remote databases remote database 1 and remote database 2. The data from record 202 stored in remote database 1 is stored in a first format. Remote database 1 includes a record 202 for Company ABC stored in a format including a Revenue (Total Revenue), Cost, Profit and Revenue Period (Revenue Period in the form mon-yyyy). Remote database 2 includes a record 204 for Company XYZ stored in a format including Profit, Cost and Timeline (Timeline in the form mm/yyyy). While the data stored in the two databases contains similar fields, their representation is completely different. The format of the data in the databases is also different from how data is depicted in application interface 210.

When data is imported from remote database 1 and remote database 2, the application interfaces with the Remote Databases to extract data in their respective formats. At 208, the application modifies the data from the remote databases 1 and 2 (records 202 and 204) to conform to a format of data storage of the application interface 210. The modified data is then displayed at the application interface 210.

From FIG. 2, it can be determined that data in application interface is to be depicted in the form of Revenue, Cost, Profit and Revenue Period. While the Profit of ABC is not explicitly stored in the record 202, the application has calculated the profit from the total revenue and cost and displayed in application interface 210. In some embodiments, the data from the remote database 1 and 2 may be stored in the same format as the data is depicted in the application. In that case, it may not be required to modify the data imported from the databases 202 and 204 before it is displayed in the application interface 210. In some embodiments, the application may be programmed to interface with multiple remote databases by application developers. For example, a user of a spreadsheet application may write code for a small add-on to connect with a database server to import data. If this works, the user may be able to share this with multiple other collaborative users for their benefit. In some embodiments, the application may already be equipped to interface with certain basic or popular databases. One of skill in the art will understand that data may be stored in remote databases in many different formats, and the formats shown in remote databases 1 and 2 are for representational purposes only.

FIG. 3 depicts importing an API to access data in a remote database 114 in a scripting application and having the scripting application provide autocomplete suggestions to the user, according to an illustrative embodiment. In particular, FIG. 3 shows a block diagram 300 of a scripting application interface 304 that imports an application programming interface (API) from a remote database 302. In some embodiments, remote database 302 may have an API that is used to extract information from remote database 302. The connection between the remote database 302 and the scripting application 304 may be established via a connection file discussed above. Instead of directly connecting with the remote database 302 to import the data, as shown in FIG. 2, the user may select to import the API of the remote database 302 to access specific data or filter data by certain parameters.

Once the connection has been established, the scripting application 304 may import the API of the remote database 302 into the scripting application. When writing a script, the user is then able to import the API at runtime, into the script using an import command as shown in the interface 304 of the scripting application. Once the user enters the import statement 308, the scripting application may provide autocomplete suggestions 306 of commands from the API upon receiving a letters typed in the scripting application interface 304. The provision of the autocomplete suggestions may be determined by many different parameters. In some embodiments, the scripting application may be configured to provide auto complete suggestions after a predetermined set of characters are typed in the interface 304. In some embodiments, the scripting application may analyze historic use of commands from the API and may order the suggestions 306 based on the historic use. For example, if a user repeatedly uses a getPerson( ) command, the scripting application may prioritize the getPerson( ) command in the autocomplete suggestions 306. In some embodiments, the scripting application 304 may also conduct an analysis of the code and order autocomplete suggestions 306 after the programmed analysis is conducted. In some embodiments, the scripting application also provides a definition 310 of the function of the API including parameters and return types. In some embodiments, this definition of each function may be provided in a separate window, or in a small section of the interface 304 as shown.

In some embodiments, scripts defined in the scripting application may be used to perform functions in other applications or databases. For example, the remote database 302 may be related to a social networking website. When the script drafted in scripting application interface 304 is executed, the script may prompt the social networking website to post content on from the account of a user. In some embodiments, the scripting application may be used to set up alerts for various parts of the remote database 302. As described in the Company Example, the remote database 302 may belong to a sales corporation and the application being used by the sales team may be notified when new data containing the sales figures for a certain quarter is added to the remote database 302. For example, the scripting application may be used to program the application being used by the sales team to send an email or message to the sales team with the notification of the new sales figures to the database. The email or message may be sent using an application that is different from the remote database 302 and the scripting application 304. In some embodiments, the scripting application may import API's of more than one remote database 302 for use. Accordingly, the scripting application may utilize the imported API of the remote database 302 to perform functions in third party applications.

Figure 4:
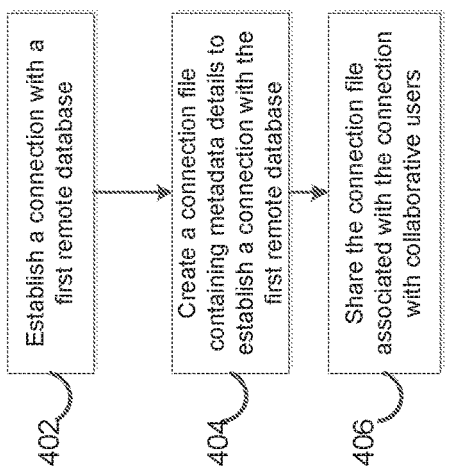
FIG. 4 is a flow chart of a process 400 that establishes a connection with the remote database and share the connection with other collaborate users, according to an illustrative embodiment.

FIG. 4 is a flow chart of a process 400 that establishes a connection with a remote database 114 by an administrator. The process 400 may be performed by processor 112 on user device 108, or processor 102 on the server 104, or another processor that is connected to network 101. The process 400 begins by establishing a connection with a first remote database 114 (step 402). The administrator of the remote database 114 then creates a connection file containing metadata details to establish a connection with the first remote database 114 (step 404). The administrator shares the connection file associated with the connection with collaborative users (step 406).

At step 402, an administrator establishes a connection with a remote database 114 for the first time. For example, an administrator at a sales company may decide to buy a database management service, and is then provided credentials to login to the database to store and modify data.

At step 404, a file is created containing metadata to establish a connection with the first remote database 114. In some embodiments, the administrator may choose to create this connection file on a cloud based environment so it may be easier to share the connection file with collaborative users. The connection file contains metadata that will help establish the connection between the user at user device 108 and the remote database 114 over network 108. The connection file also defines the subset of the database to which the user may be provided access.

At step 406, the connection file associated with the connection is shared with collaborative users. The connection file may be shared with collaborative users over a document sharing platform. The user may be notified in the form of an email of the sharing of the connection file.

In some embodiments, the users may open the connection file and automatically establish a connection with remote database 114 without having to interact with the interface of the remote database 114. Then the user may open up an application in the document sharing platform and use the connection established to import data from the remote database 114 to the application for modification. For example, a user after receiving the connection file on a document sharing platform, may establish a connection the with the remote database 114 by opening the file, and after establishing a connection, may open a spreadsheet application on the document sharing platform to import data from the remote database 114 to access and modify the information.

Figure 5:
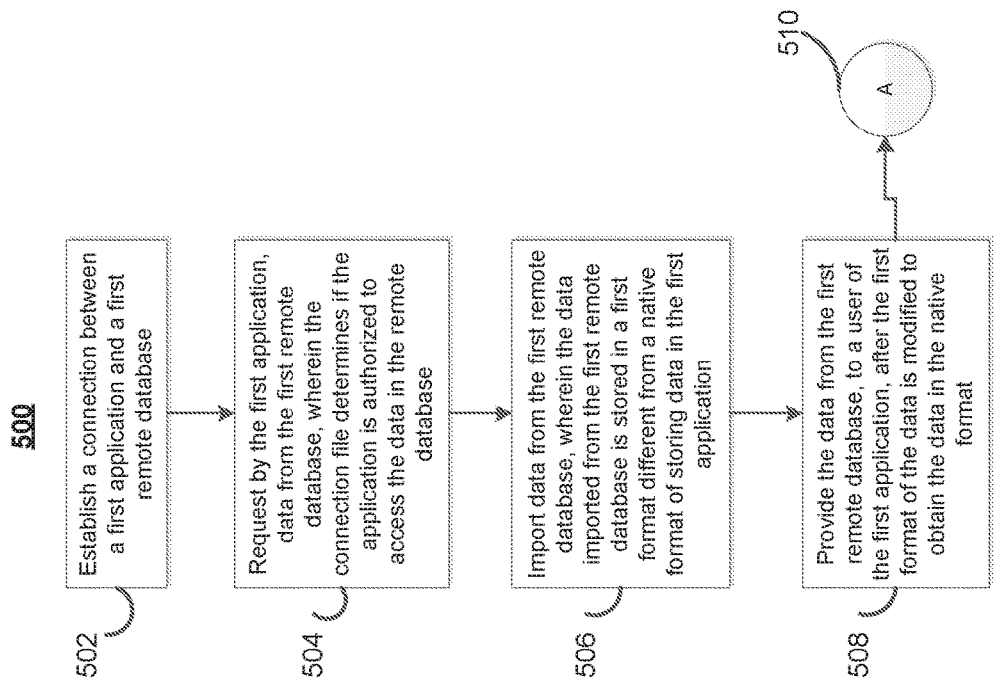
FIG. 5 is a flow chart of a process 500 that establishes a connection between a remote database and an application to import data from the remote database to the application, according to an illustrative embodiment.

FIG. 5 is a flowchart of a process 500 executed by an application to connect to remote database 114 to import data from the remote database 114 to the application and modify the format of the data imported from the database before the data is displayed in the application at a user device. The process 500 may be performed by the application that is executed on user device 108 or server 104. The process 500 begins by establishing a connection between a first application and a remote database (step 502), requesting data from the first remote database, wherein the connection file determines if the application is authorized to access the data in the remote database (step 504), and importing data from the first remote database, wherein the data imported from the first remote database is stored in a first format different from a native format of storing data in the first application (step 506). The data from the first remote database is provided, to a user of the first application, after the first format to the data is modified to obtain the data in the native format (step 508).

At step 502, the application establishes a connection between the application and remote database 114. The connection between the application and the remote database 114 may be established using a connection file as discussed earlier with respect to FIG. 4. In some embodiments, the connection file may be shared with the user over a document sharing platform. The execution of this connection file may lead to a connection between the application stored on the document sharing platform and the remote database 114. In some embodiments, the user does not interact with the interface of the remote database 114 to establish the connection.

At step 504, the application generates a request for data from the remote database, wherein the connection file determines if the application is authorized to access the data in the remote database. Once the connection has been established, the user may then proceed to import data from the remote database 114 for processing. In some embodiments, because the user does not interact with the interface of the remote database 114, the only way to access data is to request data from the remote database to be imported into the application on a document sharing system which is connected to the remote database 114. However, the user may not be provided with access to the entire database. The connection file, used to establish the connection may also contains metadata determining the subset of the remote database 114 to which the user has been provided access.

At step 506, the application imports data from the remote database, wherein the data imported from the remote database is stored in a first format different from a native format of storing data in the application. In some embodiments, the application may determine that the data in the remote database 114 is stored in a format that is different from a native format of display of the application. The application may choose to display data in a specific format for the convenience of the user. This format may be decided by a developer of the application or by a user interacting with the application. The specific format may be useful when data from different databases is imported into the application. By modifying all the imported data to the same format, the application makes it easier for the user interacting with the data. The modifying of the data before displaying is described in more detail in relation to FIG. 2.

At step 508, the application provides the data from the remote database, to a user of the application, after the first format of the data is modified to obtain the data in the native format. Once the format of the importing data has been modified, the application then presents the data imported from the remote database 114 to a user at user device 108.

Figure 6:
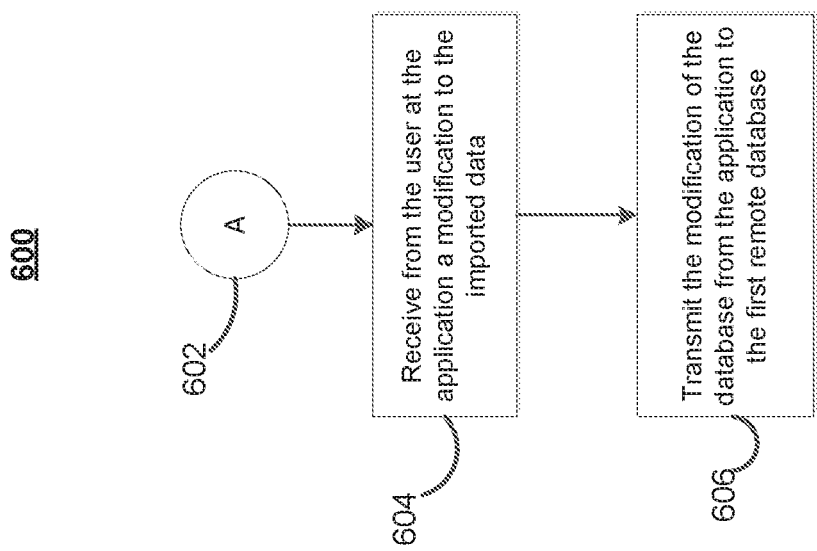
FIG. 6 is a flow chart of a process 600 that transmits any modifications made to the imported data to the remote database, according to an illustrative embodiment.

FIG. 6 is a flowchart of a process 600 executed by an application to save the changes made at the application to the remote database 114. Once the data imported from the application is displayed to the user at user device 108, the user begins to interact with it. The process 600 may be performed by the application, where the application may be executed on user device 108 or server 104. The process 600 begins at 602, which as indicated at 510 in FIG. 5, is after the data is imported from a remote database 114 to be displayed on the interface of the application. The process 600 receives from the user at the application a modification to the imported data (step 604) and then transmits the modification of the database from the application to the remote database (step 606).

At step 604, the application receives from the user at the application a modification to the imported data. The modification may be in the form of edits to the imported data, adding or removing data or any other form of modification.

At step 606, the application transmits the modification of the imported data to the remote database 114 from where the data was imported. In some embodiments, the transmission of changes from the application may occur at regular time intervals without an explicit request from the user. In some embodiments, the user may be given the option to decide whether or not they wish to transmit changes back to the remote database 114. In case the user wishes to send the changes back, the user may have to explicitly make that request by selecting an option on the application interface. The option may be 'Save' or 'Export', for example. In some embodiments, the user may wish to not transmit changes made to the imported data in the application back to the remote database 114. In such cases the user may discard the changes made, or may save a local version of the changes for later reference.

Figure 7:
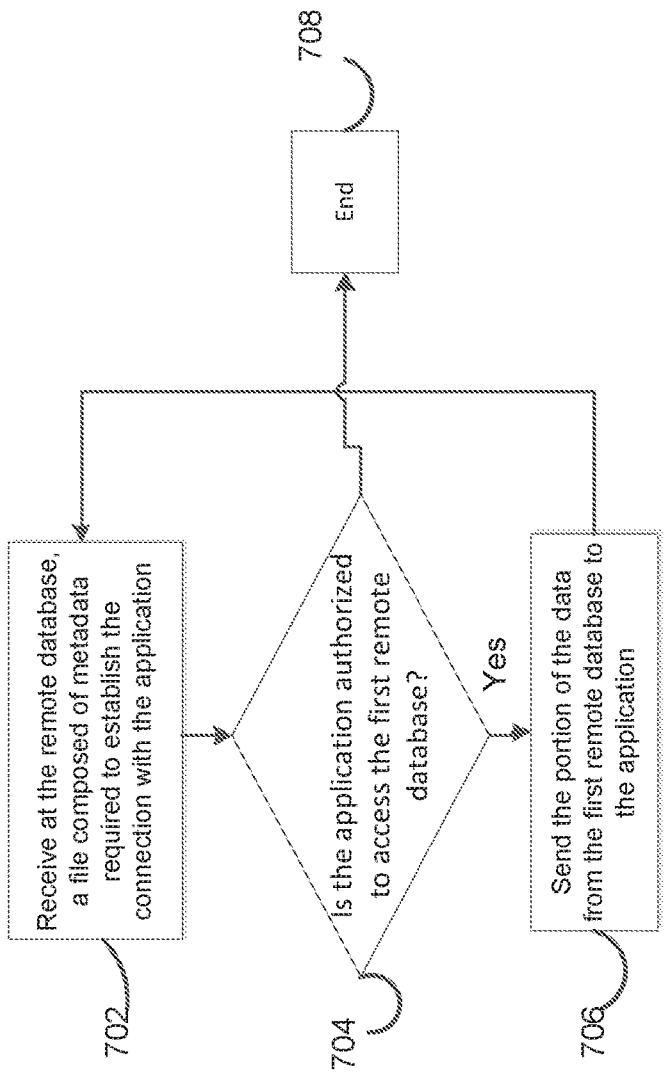
FIG. 7 is a flow chart of a process 700 that verifies if the application is authorized to access data in a portion of a remote database, according to an illustrative embodiment.

FIG. 7 is a flowchart of a process 700 executed by a remote database 114 to determine whether the user associated with the application requesting data from remote database 114 is authorized to access the requested data. The process 700 begins by receiving at the remote database 114, a file composed of metadata required to establish the connection with the application (step 702). The remote database 114 determines if the application is authorized to access the remote database 114 (decision block 704). If the application is authorized, the remote database 114 sends the portion of the data from the remote database to the application (step 706), and if the application is not authorized the remote database 114 ends the process (step 708).

At step 702, the remote database 114 receives a file composed of metadata required to establish the connection with the application. In some embodiments, the file may be the connection file containing metadata to connect with the application. The creation of the connection file is described in great detail in FIG. 4. In some embodiments, the connection file may be accompanied with a request to access a portion of the remote database 114.

At decision block 704, the remote database 114 examines the metadata in the connection file to determine if the application requesting the connection is authorized to access data from the remote database 114. In some embodiments, the remote database 114 analyzes the components of the connection file to authenticate the credentials present in the connection file to provide access to the data in the remote database 114. In some embodiments, the remote database 114 also verifies if the connection file of the application has access to the portion of database from which the data has been requested. For example, it is possible that a member of the finance team of a firm may request personnel data. While this user has been provided access to the database, the access is restricted to the financial section of the database. The remote database 114 may analyze the connection file of the user and determine that the connection file does not include permissions to access the personnel data.

Once the remote database determines that the user associated with the application has access to the requested portion of the database, at step 706 the remote database sends the requested portion of the database to the application. Otherwise, the remote database 114 ends process 700.

Figure 8:
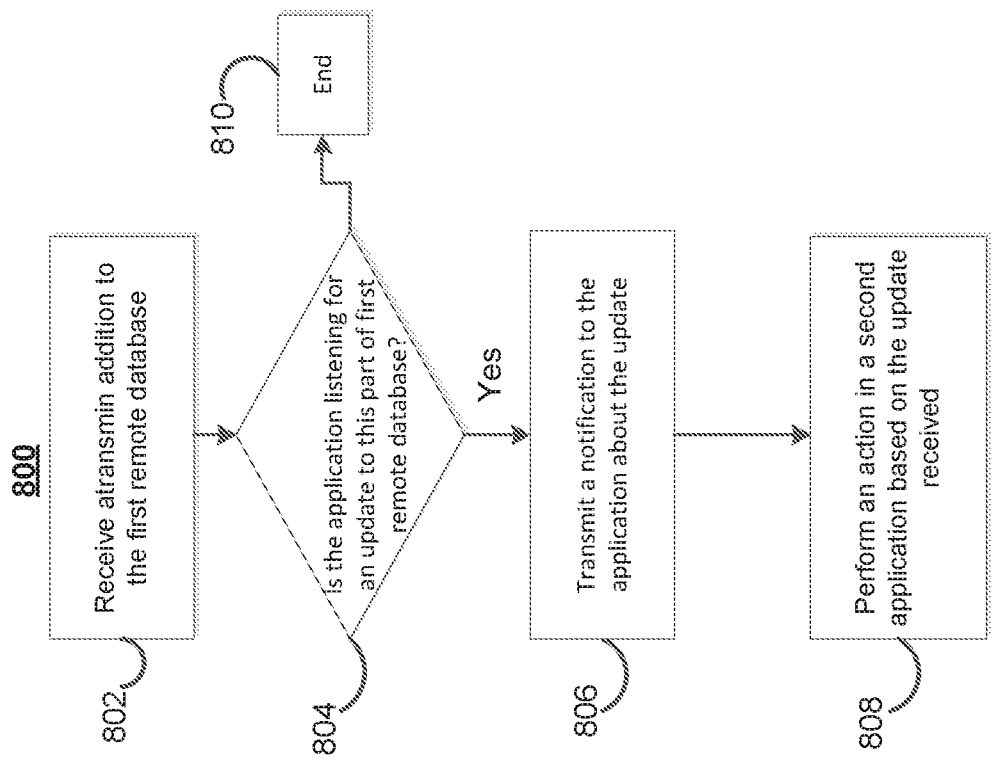
FIG. 8 is a flow chart of a process 800 that performs an action in a second application based on an update received in the remote database, according to an illustrative embodiment.

FIG. 8 is a flowchart of process 800 to execute an action based on an addition of information in the remote database 114. The following description describes the steps of process 800 as being performed by a processor, which may be any suitable processor on remote database 114, user device 108 and server 104. The process 800 begins when the remote database receives an addition (step 802). The remote database 114 or processor then proceed to determine if the application listening for an update to this part of the remote database 114 (decision block 804). If the application is listening for an update, the remote database 114 or processor transmit a notification to the application about the update (step 806). The processor upon receiving the update performs an action in a second application based on the received update (step 808). If the processor determines that the application may not be listening for updates to that portion of the database, the process 800 ends (step 810).

At step 802, the remote database 114 receives an addition of data. The addition of data may be in the form of new rows or columns added to a remote database 114. In some embodiments, the addition of data may be a post at a social networking website.

At decision block 804, the processor determines if the application is listening for an update to the portion of the document. In some embodiments, the user associated with the application may write scripts using scripting application (discussed in FIG. 3), to monitor a portion of a database. In some embodiments, the application may ask the remote database 114 at fixed intervals of time if there were any changes made to the remote database 114. In some embodiments, the script may force the remote database 114 to report to the application if any changes were made to a portion of the database. This method saves time and resources on the part of the application as the application does not have to keep looking for changes in the remote database 114. Once the remote database 114 or processor determines that the application needs to be notified about the addition of data to the remote database 114 the process 800 proceeds to step 806.

At step 806, the processor transmit a notification to the application about the update to the remote database 114.

At step 808, the application may be programmed to perform an action in a second application based on the received update. In some embodiments, the action may be in the form of sending an email message to notify users about the new data added to the remote database 114. For example, the sales team of a company may need to be notified when the sales figures of a quarter are updated in the remote database. In some embodiments, the notification may be a different alert to the user like text messages, desktop notifications for example. In some embodiments, the scripting application discussed in relation to FIG. 3, may program the application to perform one or more actions based on the new information. For example, the user may receive a calendar invite to a gala. The event may be added to the remote database 114 associated with the calendar. The calendar application of the user may be notified, and may be programmed to then provide suggestions to the user to book a car to take the user to the gala on the night of the gala. The scripting application may be programmed to recognize changes in the user's calendar and provide suggestions of functions to be performed in response to the update to the calendar. In some embodiments, the action may be performed in the second application instead of providing a suggestion because the API of the second application is imported in the scripting application as disclosed in FIG. 3.

The examples described in this disclosure are for representational purposes only. One of skill in the art will understand that the functions of the scripting application, remote database 114, and application are not limited to the embodiments described here.

FIG. 9 is a block diagram of a computing device, such as any of the components of the system of FIG. 1, for performing any of the processes described herein. Each of the components of these systems may be implemented on one or more computing devices 900. In certain aspects, a plurality of the components of these systems may be included within one computing device 900. In certain implementations, a component and a storage device may be implemented across several computing devices 900.

The computing device 900 comprises at least one communications interface unit, an input/output controller 910, system memory, and one or more data storage devices. The system memory includes at least one random access memory (RAM 902) and at least one read-only memory (ROM 904). All of these elements are in communication with a central processing unit (CPU 906) to facilitate the operation of the computing device 900. The computing device 900 may be configured in many different ways. For example, the computing device 900 may be a conventional standalone computer or alternatively, the functions of computing device 900 may be distributed across multiple computer systems and architectures. In FIG. 9, the computing device 900 is linked, via network or local network, to other servers or systems.

The computing device 900 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 908 to a communications hub or port (not shown) that serves as a primary communication link with other servers, client or user computers and other related devices. The communications hub or port may have minimal processing capability itself, serving primarily as a communications router.

The CPU 906 comprises a processor, such as one or more conventional microprocessors and one or more supplementary co-processors such as math co-processors for offloading workload from the CPU 906. The CPU 906 is in communication with the communications interface unit 908 and the input/output controller 910, through which the CPU 906 communicates with other devices such as other servers, user terminals, or devices. The communications interface unit 908 and the input/output controller 910 may include multiple communication channels for simultaneous communication with, for example, other processors, servers or client terminals.

The CPU 906 is also in communication with the data storage device. The data storage device may comprise an appropriate combination of magnetic, optical or semiconductor memory, and may include, for example, RAM 902, ROM 904, flash drive, an optical disc such as a compact disc or a hard disk or drive. The CPU 906 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 906 may be connected to the data storage device via the communications interface unit 908. The CPU 906 may be configured to perform one or more particular processing functions.

The data storage device may store, for example, (i) an operating system 912 for the computing device 900; (ii) one or more applications 914 (e.g., computer program code or a computer program product) adapted to direct the CPU 906 in accordance with the systems and methods described here, and particularly in accordance with the processes described in detail with regard to the CPU 906; or (iii) database(s) 916 adapted to store information that may be utilized to store information required by the program.

The operating system 912 and applications 914 may be stored, for example, in a compressed, an uncompiled and an encrypted format, and may include computer program code. The instructions of the program may be read into a main memory of the processor from a computer-readable medium other than the data storage device, such as from the ROM 904 or from the RAM 902. While execution of sequences of instructions in the program causes the CPU 906 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to any of the processes as described herein. The program also may include program elements such as an operating system 912, a database management system and "device drivers" that allow the processor to interface with computer peripheral devices (e.g., a video display, a keyboard, a computer mouse, etc.) via the input/output controller 910.

The term "computer-readable medium" as used herein refers to any non-transitory medium that provides or participates in providing instructions to the processor of the computing device 900 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 906 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1000 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information. In general one of ordinary skill in the art that the source features, destination features and content of the document are not limited in any way by the examples provided above.

The invention claimed is:

1. A computer-implemented method for performing data integration, the method comprising:
   establishing a connection between a first application and a first remote database, wherein the connection is established using a connection file containing metadata required to establish the connection, and wherein the connection file defines one or more subsets of data in the first remote database that the first application is authorized to access, the first application configured to operate on the one or more subsets of data;
   requesting, by the first application, data from the first remote database labeled with a first set of fields, wherein the connection file is used to determine whether the requested data belongs to the one or more subsets of data that the first application is authorized to access;
   after determining that the first application is authorized to access the requested data, importing the data labeled with the first set of fields from the first remote database;
   converting, by the first application, the data labeled with the first set of fields to data labeled with a native set of fields that is specific to the first application for use in operations performed by the first application other than converting the data labeled with the first set of fields; and
   providing the data labeled with the native set of fields to a user of the first application.

2. The method of claim 1, further comprising establishing a second connection between the first application and a second remote database while the first application is still connected to the first remote database.

3. The method of claim 2, wherein data in the second remote database is labeled with a second set of fields, and the method further comprises importing data labeled with the second set of fields from the second remote database and converting, by the first application, the data labeled with the second set of fields to additional data labeled with the native set of fields.

4. The method of claim 1, wherein the connection file is shared with a plurality of collaborative users of the first application by an administrator of the first remote database, wherein the plurality of collaborative users includes the user.

5. The method of claim 1, wherein the data labeled with the first set of fields is hidden from the user.

6. The method of claim 1, further comprising:
receiving, from the user, a modification of the data labeled with the native set of fields to obtain modified data labeled with the native set of fields;
converting the modified data labeled with the native set of fields to modified data labeled with the first set of fields; and
transmitting the modified data labeled with the first set of fields to the first remote database.

7. The method of claim 1, further comprising:
receiving, from the first remote database, additional data labeled with the first set of fields when the additional data labeled with the first set of fields is added to the first remote database.

8. The method of claim 7, wherein the connection file is shared with a plurality of collaborative users of the first application by an administrator of the first remote database, wherein the plurality of collaborative users includes the user, and the receiving of the additional data labeled with the first set of fields causes a notification to be transmitted to the plurality of collaborative users.

9. The method of claim 1, wherein establishing the connection between the first application and the first remote database comprises using an application programming interface associated with the first remote database, the method further comprising:
importing the application programming interface of the first remote database into the first application and providing, using the first application, the user with suggested autocomplete functions to be performed in the first application.

10. The method of claim 1, wherein the connection file includes tokens to access the one or more subsets of data.

11. A system for performing for performing data integration, the system comprising at least one processor configured to:
establish a connection between a first application and a first remote database, wherein the connection is established using a connection file containing metadata required to establish the connection, and wherein the connection file defines one or more subsets of data in the first remote database that the first application is authorized to access, the first application configured to process the one or more subsets of data;
request, by the first application, data from the first remote database labeled with a first set of fields, wherein the connection file is used to determine whether the requested data belongs to the one or more subsets of data that the first application is authorized to access;
after determining that the first application is authorized to access the requested data, import the data labeled with the first set of fields from the first remote database;
convert, by the first application, the data labeled with the first set of fields to data labeled with a native set of fields that is specific to the first application for processing by the first application other than to convert the data labeled with the first set of fields; and
provide the data labeled with the native set of fields to a user of the first application.

12. The system of claim 11, wherein the processor is further configured to establish a second connection between the first application and a second remote database while the first application is still connected to the first remote database.

13. The system of claim 12, wherein data in the second remote database is labeled with a second set of fields, and the system further comprises imported data labeled with the second set of fields from the second remote database and convert, by the first application, the data labeled with the second set of fields to additional data labeled with the native set of fields.

14. The system of claim 11, wherein the connection file is shared with a plurality of collaborative users of the first application by an administrator of the first remote database, wherein the plurality of collaborative users includes the user.

15. The system of claim 11, wherein the data labeled with the first set of fields is hidden from the user.

16. The system of claim 11, wherein the processor is further configured to:
receive, from the user, a modification of the data labeled with the native set of fields to obtain modified data labeled with the native set of fields;
convert the modified data labeled with the native set of fields to modified data labeled with the first set of fields; and
transmit the modified data labeled with the first set of fields to the first remote database.

17. The system of claim 11, wherein the processor is further configured to:
receive, from the first remote database, additional data labeled with the first set of fields when the additional data labeled with the first set of fields is added to the first remote database.

18. The system of claim 17, wherein the connection file is shared with a plurality of collaborative users of the first application by an administrator of the first remote database, wherein the plurality of collaborative users includes the user, and the received additional data labeled with the first set of fields causes a notification to be transmitted to the plurality of collaborative users.

19. The system of claim 11, wherein establishing the connection between the first application and the first remote database comprises using an application programming interface associated with the first remote database, and wherein the processor is further configured to:
import the application programming interface of the first remote database into the first application and providing, using the first application, the user with suggested autocomplete functions to be performed in the first application.

20. The system of claim 11, wherein the connection file includes tokens to access the one or more subsets of data.

* * * * *